United States Patent
Balasubramaniyan et al.

(10) Patent No.: US 11,315,344 B2
(45) Date of Patent: Apr. 26, 2022

(54) RECONFIGURABLE 3D CONVOLUTION ENGINE

(71) Applicant: HCL TECHNOLOGIES LIMITED, Uttar Pradesh (IN)

(72) Inventors: Prasanna Venkatesh Balasubramaniyan, Chennai (IN); Sainarayanan Gopalakrishnan, Chennai (IN); Gunamani Rajagopal, Chennai (IN)

(73) Assignee: HCL TECHNOLOGIES LIMITED, Noida (IN)

( * ) Notice: Subject to any disclaimer, the term of this patent is extended or adjusted under 35 U.S.C. 154(b) by 292 days.

(21) Appl. No.: 16/721,683

(22) Filed: Dec. 19, 2019

(65) Prior Publication Data
US 2020/0218917 A1  Jul. 9, 2020

(30) Foreign Application Priority Data
Jan. 7, 2019 (IN) .............................. 201911000737

(51) Int. Cl.
*G06V 10/94* (2022.01)
*G06N 3/04* (2006.01)

(52) U.S. Cl.
CPC ............... *G06V 10/94* (2022.01); *G06N 3/04* (2013.01)

(58) Field of Classification Search
CPC combination set(s) only.
See application file for complete search history.

(56) References Cited

U.S. PATENT DOCUMENTS

| 2017/0345130 A1* | 11/2017 | Wang ................... H04N 7/0117 |
| 2017/0356976 A1* | 12/2017 | Shapiro ................ G06V 20/698 |
| 2017/0358053 A1 | 12/2017 | Savransky et al. |
| 2018/0189641 A1* | 7/2018 | Boesch ................ G06N 3/0472 |

(Continued)

FOREIGN PATENT DOCUMENTS

| CN | 107403117 A | 11/2017 |
| CN | 107491416 A | 12/2017 |
| EP | 3153996 A2 | 4/2017 |

OTHER PUBLICATIONS

Fengbin Tu, "Deep Convolutional Neural Network Architecture with Reconfigurable Computation Patterns", Apr. 12, 2017, IEEE Transactions on Very Large Scale Integration (VLSI) Systems (vol. 25, Issue: 8, Aug. 2017), pp. 2220-2231.*

(Continued)

*Primary Examiner* — Omar S Ismail
(74) *Attorney, Agent, or Firm* — Kendal Sheets

(57) ABSTRACT

Disclosed is a reconfigurable convolution engine for performing a convolution operation on an image. A data receiving module receives image data. A determination module determines a kernel size based on the image data, clock speed associated to the convolution engine and number of available on-chip resources. An allocation module allocates a plurality of instances based on the kernel size. Each instance of the plurality of instances further comprises a set of computing blocks operating concurrently. Each computing block is configured to perform convolution operation on the feature map of the image. An aggregation module aggregates the convolution output of each computing block for each instance of the plurality of instances to produce a convolution result for the image.

9 Claims, 3 Drawing Sheets

(56) References Cited

U.S. PATENT DOCUMENTS

| | | | |
|---|---|---|---|
| 2019/0043203 A1* | 2/2019 | Fleishman | G06T 17/00 |
| 2019/0043242 A1* | 2/2019 | Risser | G06T 15/04 |
| 2019/0095784 A1* | 3/2019 | Grill | G06N 3/0675 |
| 2019/0122378 A1* | 4/2019 | Aswin | G06T 5/003 |
| 2020/0118423 A1* | 4/2020 | Moura | G08G 1/04 |

OTHER PUBLICATIONS

Hai Wang, "Enhanced Efficiency 3D Convolution Based on Optimal FPGA Accelerator", Jun. 7, 2017, IEEE Access (vol. 5), pp. 6909-6914.*

Yufei Ma,"Optimizing the Convolution Operation to Accelerate Deep Neural Networks on FPGA", Apr. 3, 2018,IEEE Transactions on Very Large Scale Integration (VLSI) Systems, vol. 26, No. 7, Jul. 2018, pp. 1354-1365.*

Cl'ement Farabet,"Hardware Accelerated Convolutional Neural Networks for Synthetic Vision Systems," Aug. 3, 2010, Proceedings of 2010 IEEE International Symposium on Circuits and Systems,pp. 257-259.*

Yu Wang,"Reconfigurable Processor for Deep Learning in Autonomous Vehicles,"Sep. 25, 2017, ITU Journal: ICT Discoveries, Special Issue No. 1, Sep. 25, 2017,pp. 1-8.*

Gabriel J. Garcia,"A Survey on FPGA-Based Sensor Systems: Towards Intelligent and Reconfigurable Low-Power Sensors for Computer Vision, Control and Signal Processing",Mar. 31, 2014, Sensors 2014, 14, 6247-6278; doi:10.3390/s140406247, pp. 6247-6260.*

A Reconfigurable Computing Architecture for Implementing Artificial Neural Networks on FPGA—Kristian Robert Nichols (Dec. 2003).

* cited by examiner

RECONFIGURABLE 3D CONVOLUTION ENGINE

CROSS-REFERENCE TO RELATED APPLICATIONS AND PRIORITY

The present application claims benefit from Indian Complete Patent Application No. 201911000737 filed on 7 Jan. 2019 the entirety of which is hereby incorporated by reference.

TECHNICAL FIELD

The present subject matter described herein, in general, relates to a reconfigurable convolution engine and more particularly to performing a convolution operation on an image by using a 3 Dimensional (3D) reconfigurable convolution engine.

BACKGROUND

In recent times, Convolution Neural Network (CNN) technique is finding greater applications in computer vision. The computer vision is used to detect a scene or an object in real time from an image captured by various systems. Example of the various systems include, but not limited to, pedestrian detection, lane detection, autonomous driving, sign board detection, activity detection, and face recognition. In order to detect the object in real time, complex computations need to be performed.

However, there is a limit on computation power of any system. This is because the hardware capabilities of any system cannot be extended in real time. In other words, the computation power is based on one or more available on-chip resources of the Field Programmable Gate Arrays (FPGA) and Application Specific Integrated Circuits (ASIC). Thus, the conventional systems and methodologies performs convolution operation only on the available on-chip resources thereby failing to perform convolution operation in real time. In addition, it has always been a challenge to reduce power usage of the conventional systems and methodologies to implement the CNN technique especially for 3D convolution operations.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for performing a convolution operation on an image using a reconfigurable convolution engine and the concepts are further described below in the detailed description. This summary is not intended to identify essential features of the claimed subject matter nor is it intended for use in determining or limiting the scope of the claimed subject matter.

In one implementation, a method for performing a convolution operation on an image using a reconfigurable convolution engine is disclosed. In order to perform the convolution operation, initially, image data may be received for performing a convolution operation on the image by using a convolution engine. Upon receiving the image data, a kernel size may be determined based on the image data, clock speed associated to the convolution engine and number of available on-chip resources. Subsequent to the determination of the kernel size, a plurality of instances may be allocated to operate depth wise in parallel mode. In one aspect, the plurality of instances may be allocated based on the kernel size. It may be noted that each instance further comprises a set of computing blocks operating concurrently to perform convolution operation on the feature map of the image. It may further be noted that each computing block is capable of generating a convolution output. Further, the convolution output generated by each computing block may be aggregated to produce a convolution result for the image. It is to be noted that the convolution output may be aggregated using a pipeline adder. In one aspect, the aforementioned method for performing the convolution operation on the image using the reconfigurable convolution engine may be performed by a processor using programmed instructions stored in a memory.

In another implementation, a reconfigurable convolution engine for performing a convolution operation on an image is disclosed. The reconfigurable convolution engine may comprise a processor and a memory coupled to the processor. The processor may execute a set of instructions present in plurality of modules. The plurality of modules may be present in the memory. The plurality of modules may comprise a data receiving module, a determination module, an allocation module, and an aggregation module. The data receiving module may receive image data for performing a convolution operation on the image. The determination module may determine a kernel size based on the image data, clock speed associated to the convolution engine and number of available on-chip resources. The allocation module may allocate a plurality of instances, to the reconfigurable convolution engine, in order to operate depth wise in parallel mode. In one aspect, the plurality of instances is allocated based on the kernel size. In another aspect, each instance of the plurality of instances may further comprise a set of computing blocks operating concurrently to perform convolution operation on the feature map of the image. It may be noted that each computing block is capable of generating a convolution output. Further, the aggregation module may aggregate the convolution output generated by each computing block to produce a convolution result for the image. It is to be noted that the convolution output may be aggregated using a pipeline adder.

In yet another implementation, non-transitory computer readable medium embodying a program executable in a computing device for performing a convolution operation on an image using a reconfigurable convolution engine is disclosed. The program may comprise a program code for receiving image data for performing a convolution operation on an image by using a convolution engine. The program may further comprise a program code for determining a kernel size based on the image data, clock speed associated to the convolution engine and number of available on-chip resources. The program may further comprise a program code for allocating a plurality of instances to the reconfigurable convolution engine in order to operate depth wise in parallel mode. In one aspect, the plurality of instances is allocated based on the kernel size. In another aspect, each instance of the plurality of instances may further comprise a set of computing blocks operating concurrently to perform convolution operation on the feature map of the image. It is to be noted that each computing block is capable of generating a convolution output. The program may further comprise a program code for aggregating the convolution output generated by each computing block to produce a convolution result for the image. It is to be noted that the convolution output may be aggregated using a pipeline adder.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
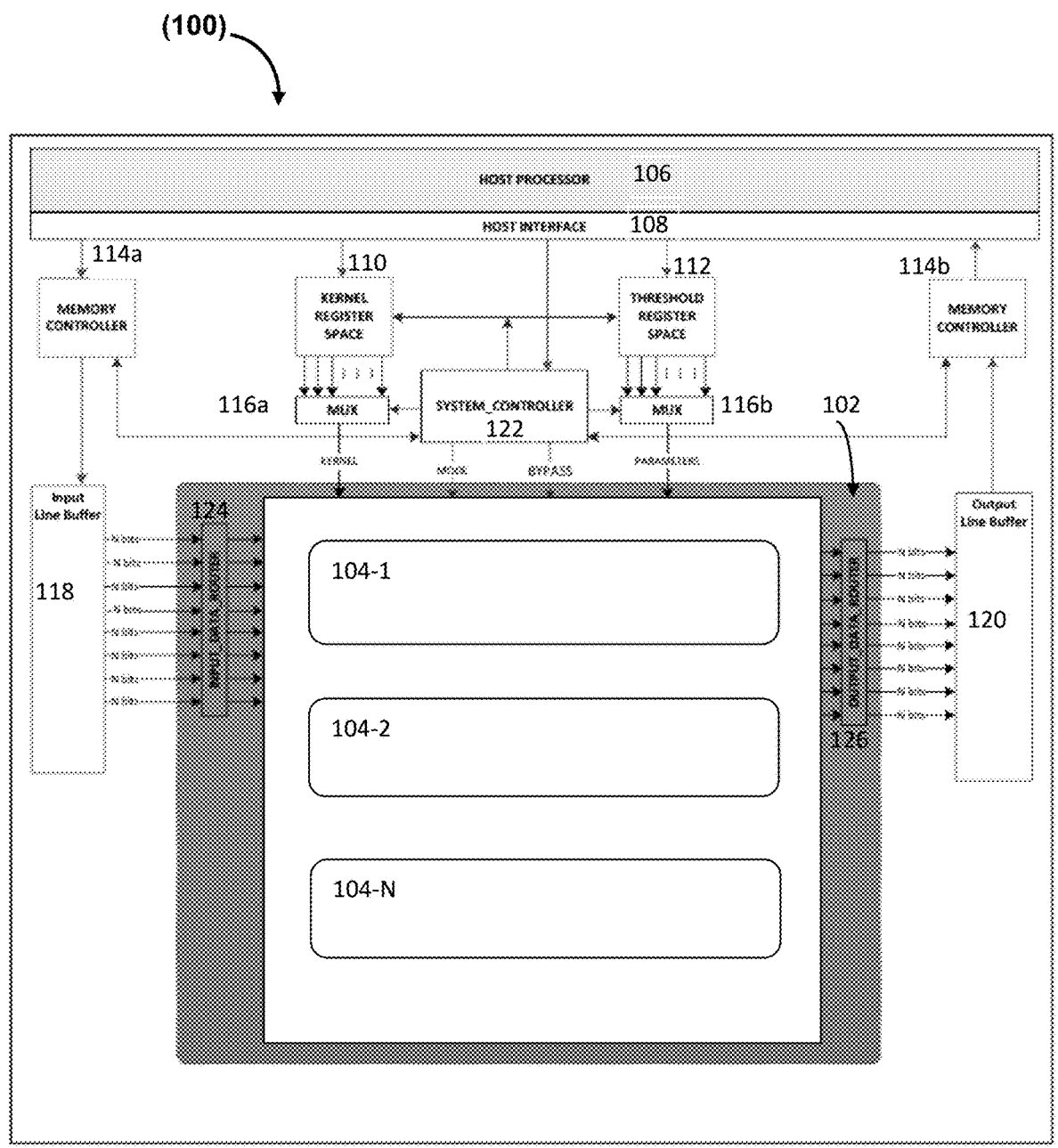
FIG. 1 illustrates a hardware implementation of a reconfigurable convolution engine for performing a convolution operation on an image, in accordance with an embodiment of the present subject matter.

Some embodiments of this disclosure, illustrating all its features, will now be discussed in detail. The words "receiving," "determining," "allocating," "configuring," "executing," and "filtering," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The present invention performs a convolution operation on an image using a reconfigurable convolution engine. It is to be noted that the reconfigurable convolution engine utilizes already available on-chip resources of at least Field Programmable Gate Arrays (FPGA) and Application Specific Integrated Circuits (ASIC). Example of the on-chip resources include, but not limited to, registers, Digital Signal Processing (DSP) chips, memory controllers, multipliers, multiplexers, and adders. The present invention focuses on a reconfigurable 3D convolution engine which consists of a plurality of instances for performing 2D and 3D convolutions on various kernel sizes (for example: 3×3, 5×5, 7×7 and 9×9) and depths. Each instance, of the plurality of instances, may be configured to perform the convolution operation on a feature map. Each instance may be configured to perform parallel row wise convolution operation on a feature map and subsequently depth wise convolution operation on different feature maps resulting in layer combining. Thus, the reconfigurable convolution engine computes the convolution operation on image/feature map plane faster and also adapt for different kernel sizes. The reconfigurable convolution engine may enable to reuse the compute resources efficiently. Example of the compute resources may include, but not limited to, a Digital Signal Processor (DSP), and a register.

The reconfigurable convolution engine may also be referred as a hardware accelerator. The hardware accelerator comprises a host processor, a set of memory controllers, an input line buffer, an output line buffer, a kernel register space, a threshold register space, an input data router, an output data router and a system controller. The host processor is an on-chip processor (for example: an ARM Processor Core) to perform task scheduling according to network architecture and parameters associated within each layer of the image.

The memory controllers connected to the input line buffer is responsible for fetching the data from the external memory (for example: DDR Memory) and transfer into input line buffers. The memory controllers connected to the output line buffer is responsible for transferring the convoluted output data to the external memory (example: DDR Memory). In an embodiment, the memory controllers may be an intermediate cache memory for further processing by subsequent network layers.

The input line buffer and output line buffer may be configured to hold single or multiple image/feature map data. The image/feature map data may be handled by the memory controllers. It is to be noted that handling of the image/feature map data may be scheduled by a host scheduler. In one embodiment, the host scheduler may also be referred as a host processor.

The input data router may be configured to receive the feature map data from the input line buffer. It is to be noted that the input data router may receive the feature map data in a bit-by-bit fashion. Further, the input data router may provide input to the reconfigurable convolution unit in the bit-by-bit fashion.

The output data router may be configured to receive convolution output of the reconfigurable convolution unit. Further to receiving the convolution output, the output data router may transmit the convolution output in the bit-by-bit fashion to the output line buffer for further processing.

The kernel register space and threshold register space may act as a local cache memory for holding the parameters associated to the network layer hosting the reconfigurable 3D convolution engine.

The system controller may act as configuration and control unit for the reconfigurable 3D convolution engine and other functional blocks comprising the memory controllers, the kernel register space, the threshold register space and the like. It is to be noted that the reconfigurable 3D convolution engine and other functional blocks may be controlled by the host scheduler. In one implementation, the host scheduler is also configured to control operations of the set of computing blocks present inside the reconfigurable 3D convolution engine.

While aspects of described system and method for performing the convolution operation on the image using the reconfigurable convolution engine and may be implemented in any number of different computing systems, environments, and/or configurations, the embodiments are described in the context of the following exemplary reconfigurable convolution engine.

Referring now to FIG. 1, a hardware implementation 100 of a reconfigurable convolution engine 102 for performing the convolution operation on an image is disclosed. The reconfigurable convolution engine 102 may be configured to perform a 3-Dimensional convolution operation on the image. The reconfigurable convolution engine 102 may comprise a plurality of instances (104-1, 104-2, ... 104-N) collectively referred as 104. The reconfigurable convolution engine 102 may be implemented in a variety of computing systems, such as a laptop computer, a desktop computer, a notebook, a workstation, and a mainframe computer. The reconfigurable convolution engine 102 may be configured to utilize on-chip resources of at least one of Field Programmable Gate Arrays (FPGA) and Application Specific Integrated Circuits (ASIC). The on-chip resources may comprise a host processor 106, a host interface 108, memory controller 114a and 114b (collectively referred as memory controller 114), a kernel register space 110, a threshold register space 112, multiplexers 116a and 116b (collectively referred as multiplexer 116), a system controller 122, an input line buffer 118, an output line buffer 120, an input data router 124, and an output data router 126.

The host processor 106 may be a Central Processing Unit (CPU) installed in at least one of the variety of computing systems. To perform the 3D convolution operation on the image, the image data is received from the host interface 108. The host processor 106 may enable the reconfigurable convolution engine 102 to communicate with other computing devices, such as web servers and external data servers (not shown). The host processor 106 can facilitate multiple communications within a wide variety of networks and protocol types, including wired networks, for example, LAN, cable, etc., and wireless networks, such as WLAN, cellular, or satellite. The host interface 108 may be a bus interface configured to execute a protocol for data transfer between the host processor 106 and the convolution engine 102. It is to be understood that a user may interact with the reconfigurable convolution engine 102 via the host interface 108. The host interface 108 may include a variety of software and hardware interfaces, for example, a web interface, a graphical user interface, and the like. The host interface 108 may allow the reconfigurable convolution engine 102 to interact with the user directly or through other client devices.

Further, the host interface 108 may include one or more ports for connecting a number of devices to one another or to another server. In an implementation, the host interface 108 may facilitate on-chip communication by implementing on-chip bus protocols including, but not limited to, Advanced Microcontroller Bus Architecture (AMBA) Advanced High-Performance bus (AHB) and Advanced Extensible Interface (AXI), Wishbone Bus, Open Core Protocol (OCP) and Core Connect Bus. In other implementation, the host interface 108 may facilitate off-chip communication by implementing off-chip bus protocols including, but not limited to, Universal Serial Bus (USB), Peripheral Component Interconnect Express (PCIe), and any other High speed interfaces.

The kernel register space 110 may be configured to hold kernel values related to the convolution layer in operation. The threshold register space 112 may be configured hold parameters for a filter function. Example of the filter function include, but not limited to, the ReLU, Sigmoid or Logistic, and Hyperbolic tangent function-Tan h. The multiplexer 116 may be configured to pass the kernel values to the convolution engine 102 for the convolution operation. The input line buffer 118 may be configured to hold the image data for the convolution operation. The output line buffer 120 may be configured to receive the output of the convolution engine 102 and buffer the output before passing to next stage of processing.

The memory controller 114 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory controller 114 is further connected to the input line buffer 118 to fetch external image data.

The system controller 122 is connected to the host interface 108, the kernel register space 110, the threshold register space 112, the multiplexer 116, the memory controller 114, and the reconfigurable convolution engine 102. The system controller 122 may be configured to generate a mode signal based on the image data received from the host interface 108. The mode signal indicates kernel size and layers of convolution to be performed on the image. In one embodiment, the system controller 122 may also be configured to provide a bypass signal to the set of computing blocks. The system controller 122 may also be configured to store programmed instructions to operate the reconfigurable convolution engine 102.

The reconfigurable convolution engine 102 may comprise the plurality of instances 104 to perform the convolution operation. It is to be noted that each of the plurality of instances comprises a set of processors to multiply one or more features present in a feature map of the image. The feature map may indicate mapping of one or more features when found in the image. The result of multiplication may be stored in an accumulator. The accumulator may store one or more results pertaining to one or more multiplication operation of the one or more features. Finally, an adder may add the one or more results to provide a convoluted output for one layer. Similarly, a pipeline adder may add the convoluted output to provide convolution result of the image.

Figure 2:
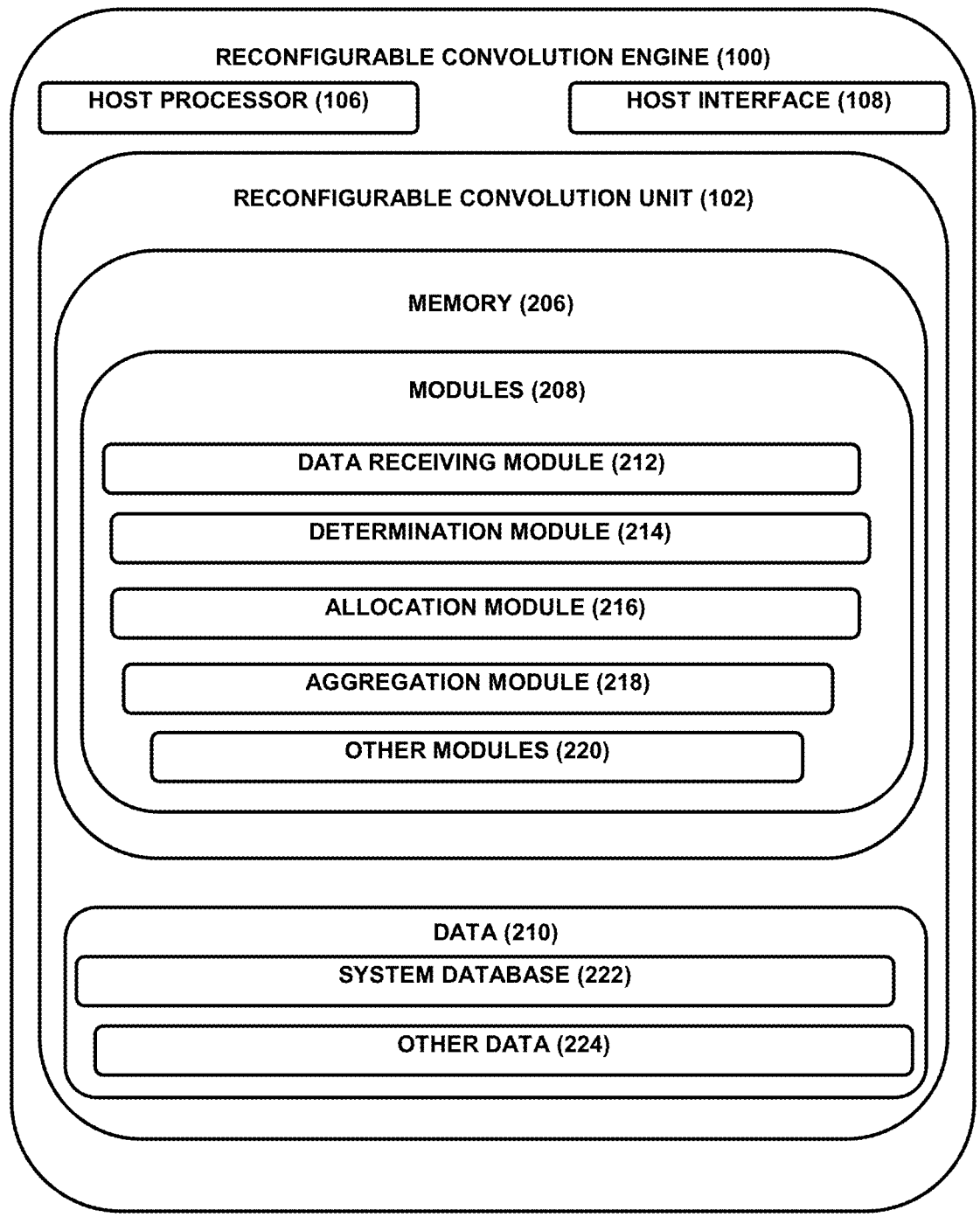
FIG. 2 illustrates the reconfigurable convolution engine, in accordance with an embodiment of the present subject matter.

Referring now to FIG. 2, the reconfigurable convolution engine 100 is illustrated in accordance with an embodiment of the present subject matter. In one embodiment, the reconfigurable convolution engine 100 may include at least one host processor 106, a host interface 108, and a reconfigurable unit 102. The reconfigurable unit 102 may further comprise a memory 206. The at least one host processor 106 may be implemented as one or more microprocessors, microcomputers, microcontrollers, digital signal processors, central processing units, state machines, logic circuitries, and/or any devices that manipulate signals based on operational instructions. Among other capabilities, the at least one host processor 106 is configured to fetch and execute computer-readable instructions stored in the memory 206. The memory 206 may include modules 208 and data 210.

The modules 208 include routines, programs, objects, components, data structures, etc., which perform particular tasks or implement particular abstract data types. In one implementation, the modules 208 may include a data receiving module 212, a determination module 214, an allocation module 216, an aggregation module 218, and other modules 220. The other modules 220 may include programs or coded instructions that supplement applications and functions of the reconfigurable convolution engine 100. The modules 208 described herein may be implemented as software modules that may be executed in the cloud-based computing environment of the reconfigurable convolution engine 100.

The data 210, amongst other things, serves as a repository for storing data processed, received, and generated by one or more of the modules 208. The data 210 may also include a system database 222 and other data 224. The other data 224 may include data generated as a result of the execution of one or more modules in the other modules 220.

As there are various challenges observed in the existing art, the challenges necessitate the need to build the reconfigurable convolution engine 100 for performing a convolution operation on an image. In order to perform the convolution operation on the image, at first, a user may use the host device to access the reconfigurable convolution engine 100 via the host interface 108. The user may register using the host interface 108 in order to use the reconfigurable convolution engine 100. In one aspect, the user may access the host interface 108 of the reconfigurable convolution engine 100. The reconfigurable convolution engine 102 may employ the data receiving module 212, the determination module 214, the allocation module 216, and the aggregation module 218. The detail functioning of the modules is described below with the help of figures.

The present subject matter describes the reconfigurable convolution engine 100 for performing a 3-Dimensional (3D) convolution operation on an image. To do so, initially, the data receiving module 212 receives image data pertaining to the image. The image data comprises a feature map, depth information, pixel resolution, number of filters to be applied, and a convolution layer. In one implementation, a filter from the number of filters may be considered as a kernel for performing the convolution operation. The kernel may also be referred as a feature detector. The feature map may indicate mapping of one or more features when found in the image. The one or more features indicates one or more active pixels corresponding to an object of interest present in the image. The depth information may indicate number of layers or filters present in the image. In an example, the depth information may be represented as a single column matrix. In one implementation, the data receiving module 212 may receive image data from the input data router.

Upon receiving the image data, the determination module 214 determines a kernel size based on the image data, clock speed associated to the convolution engine and number of available on-chip resources. In an implementation, the kernel size may also be determined based on the mode signal received from the host processor 108. In an implementation, the kernel size may be determined based on the convolution layer received from the host interface 108.

Subsequent to determining the kernel size, the allocation module 216 allocates a plurality of instances to the reconfigurable convolution engine 100 based on the kernel size. An instance from the plurality of instances may also be referred as Mini Parallel Rolling Engine (MPRE). In one aspect, the MPRE is configured to operate depth wise in parallel mode. In another aspect, each instance of the plurality of MPREs may further comprise a set of computing blocks operating concurrently. Computing block hereinafter may also be referred as a Convolution Multiply and Accumulator (CMAC). It is to be noted that each CMAC is configured to perform convolution operation on the feature map of the image in order to generate a convolution output. Further, the convolution operation may be performed in sync with the clock speed of the convolution engine. In one aspect, each instance of the plurality of instances is configured to perform parallel row wise convolution operation on the feature map and subsequently depth wise convolution operation on different feature maps resulting in layer combining.

In one example, if an image with size 'm*n' is received for performing convolution operation, the allocation module 216 may allocate 'm' number of computing blocks to each instance of the plurality of instances to perform convolution operation. It is to be noted that each computing block comprises a multiplier function, an accumulator function and an aggregation function. In an implementation, the multiplier function may be configured to multiply one or more feature present in the feature map with numerical values present in the single column matrix of the depth information.

In an embodiment, when the set of computing blocks comprises computing blocks more than 'm', the system controller 122 may shut down remaining computing blocks to reduce memory and power consumption. In another implementation, one or more computing blocks from the set of computing blocks may be grouped in a cluster to perform concurrent convolution operation on the feature map. It is to be noted that the cluster may be formed upon receipt of the signal from the system controller 122. In yet another implementation, when the convolution operation performed by the computing block is complete for an intermediate layer, the computing block may be grouped together with other computing blocks from the set of computing blocks to perform convolution operation on subsequent image frames. It is to be noted that the computing block may be grouped together with the other computing blocks based on signal received from the host scheduler. In one aspect, the host scheduler may be configured to free up space occupied by the computing block when the convolution operation is complete. Further, the computing block may be grouped together with the other computing blocks for performing convolution operation on the subsequent image frames present in pipeline. Furthermore, result of each computing block, operating in the pipeline, may be aggregated using the pipeline adder.

In order to elucidate further, consider number of intermediate layers in an image is more than 150. Assuming number of available CMACs as 100, the host scheduler may signal for grouping the CMACs into smaller groups to perform the convolution operation on the intermediate layers. In an example, each group may comprise 50 CMACs. In another example, when convolution operation performed by one or more CMACs belonging to at least one group is complete, the host scheduler may signal the one or more CMACs to be grouped with other groups of CMACs to perform the convolution operation on the intermediate layer. It is to be noted that host scheduler is configured to free up space of the CMAC based on the number of intermediate layers and the availability of the CMACs in one MPRE.

In another example, assume if one MPRE instance contains 500 CMAC elements, then 500 CMAC elements may be grouped as (250×2) or (100×5) or (50×10) and so on. It is to be noted that grouping of the CMAC is based on network complexity and user requirement as processed by the host processor (host scheduler).

After performing the convolution operation, the aggregation module 218 aggregates the convolution output generated by each computing block for each instance of the plurality of instances to produce a convolution result for the image. It is to be noted that the aggregation module 218 utilizes a pipeline adder to aggregate the convolution output of each computing block. The pipeline adder may be configured to operate in parallel with the plurality of instances. In one example, the one or more instances of the plurality of instances may also be grouped together to perform convolution operation on the feature map. In such scenarios, the convoluted result may be an aggregated output of the convolution outputs of the one or more groups of the plurality of instances. In such example, the the pipeline adder may be configured to aggregate the convolution outputs of the one or more groups to provide the convoluted result. In one embodiment, the convolution result may be received by an output data router in bit-by-bit fashion.

In one embodiment, once the convolution operation is executed, the convoluted result may be filtered by using a filter function. Example of the filter function include, but not limited to, a Rectified Linear Unit (ReLU), Sigmoid or Logistic, and Hyperbolic tangent function-Tan h. In one implementation, the filter function may be configured to operate based on input signal provided by the host interface 108 thereby performing the convolution operation on the image using the reconfigurable convolution engine 100. In one implementation, the reconfigurable convolution engine 100 may be utilized to perform convolution operation for at least one of Convolution Neural Network (CNN) technique, Deep Recurrent Neural Network (Deep RNN) technique, and Artificial Neural Network (ANN) technique.

In order to elucidate further, consider an example where image size=1280×960; stride=1; kernel size=3×3; depth=512 and number of input filter=1. Assuming the clock speed of the reconfigurable convolution engine 100 as 100 MHz i.e. 10 ns and number of plurality of instances=1.

Number of convolutions for the image using 3×3 kernel size=9×10 ns=90 ns (for Feature map 1)

Time taken to complete Convolution for 512 Feature maps=512×90 ns=46 usec (approx.)

Time taken to complete Convolution for all the 960 ROWS=46 us×960=44 msec.

Now if the number of plurality of instances=2;

Time taken to complete Convolution for all 512 Feature Maps=44 msec/2=22 msec

Now if the number of plurality of instances=10;

Time taken to complete Convolution for all 512 Feature Maps=44 msec/10=4.4 msec.

Thus, by increasing the number of plurality of instances, effective time for execution of the convolution operation may be reduced.

Figure 3:
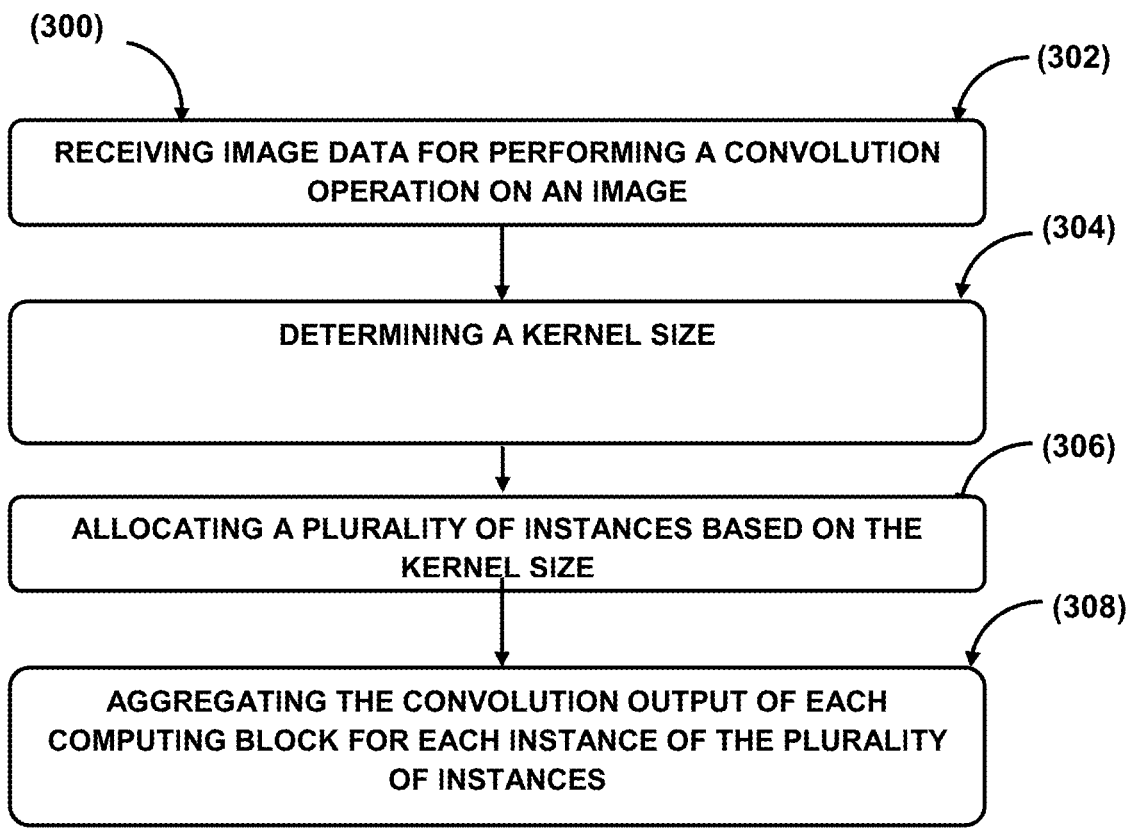
FIG. 3 illustrates a method for performing a convolution operation on an image by using a reconfigurable convolution engine, in accordance with an embodiment of the present subject matter.

Referring now to FIG. 3, a method 300 for performing a convolution operation on an image using a reconfigurable convolution engine is shown, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented as described in the reconfigurable convolution engine 102.

At block 302, image data may be received for performing a convolution operation on an image by using a convolution engine. In one implementation, the image data, for performing a convolution operation on an image by using a convolution engine, may be received by a data receiving module 212.

At block 304, a kernel size may be determined based on the image data, clock speed associated to the convolution engine and number of available on-chip resources. In one implementation, the kernel size may be determined by a determination module 214.

At block 306, a plurality of instances may be allocated based on the kernel size. In one aspect, the plurality of instances is configured to operate depth wise in parallel mode. In another aspect, each instance of the plurality of instances further comprises a set of computing blocks operating concurrently. Each computing block may be configured to perform convolution operation on the feature map of the image. In one implementation, the plurality of instances may be allocated based on the kernel size by an allocation module 216.

At block 308, the convolution output of each computing block for each instance of the plurality of instances may be aggregated to produce a convolution result for the image. In one aspect, the convolution output may be aggregated using a pipeline adder. In one implementation, the convolution output of each computing block for each instance of the plurality of instances may be aggregated by an aggregation module 218.

Exemplary embodiments discussed above may provide certain advantages. Though not required to practice aspects of the disclosure, these advantages may include those provided by the following features.

Some embodiments enable a system and a method to perform 3D convolution operations in concurrent.

Some embodiments enable a system and a method to enhance processing power of the available on chip resources by concurrently performing convolution operations.

Some embodiments enable a system and a method to reuse same resource for one or more convolution layer.

Some embodiments enable a system and a method to reconfigure the convolution engine based on various kernel sizes.

Some embodiments enable a system and a method to increase throughput of the reconfigurable convolution engine by increasing an operating frequency of the reconfigurable convolution engine.

Although implementations for methods and systems for performing a convolution operation on an image using a reconfigurable convolution engine have been described in language specific to structural features and/or methods, it is to be understood that the appended claims are not necessarily limited to the specific features or methods described. Rather, the specific features and methods are disclosed as examples of implementations for performing a convolution operation on an image using a reconfigurable convolution engine.

The invention claimed is:

1. A method for performing a convolution operation on an image using a reconfigurable convolution engine, the method comprising:
   receiving, by a host processor, image data for performing a convolution operation on an image by using a convolution engine, wherein the image data comprises a feature map and a depth information associated to an image;
   determining, by the host processor, a kernel size based on the image data, clock speed associated to the convolution engine and a number of available on-chip resources;
   allocating a plurality of instances, to the host processor, to operate depth wise in parallel mode, wherein the plurality of instances is allocated based on the kernel size, and wherein each instance, of the plurality of instances, performs parallel row wise convolution operation on the feature map and subsequently depth wise convolution operation on different feature maps resulting in layer combining, and wherein each instance further comprises a set of computing blocks operating concurrently to perform convolution operation on the feature map of the image in order to generate a convolution output;
   clustering one or more computing blocks with other computing blocks present in the set of computing blocks, when convolution operation performed, for an intermediate layer of the image, by the one or more computing blocks is complete, and wherein the other computing blocks are performing convolution operation on subsequent images; and
   aggregating, by the host processor, the convolution output generated by each computing block to produce a convolution result for the image, wherein the convolution output is aggregated using a pipeline adder.

2. The method of claim 1, wherein the image data comprises pixel resolution, number of filters to be applied, and a convolution layer.

3. The method of claim 1, wherein result of each computing block operating in pipeline is aggregated using the pipeline adder to generate the convolution result.

4. The method of claim 1, wherein one or more instances of the plurality of instances are grouped in a cluster to perform convolution operation on the feature map.

5. A reconfigurable convolution engine for performing a convolution operation on an image, the reconfigurable convolution engine comprising:
   a host processor; and
   a memory coupled to the host processor, wherein the host processor is capable of executing a set of instructions stored in the memory, and wherein the set of instructions comprises:
      receiving image data for performing a convolution operation on an image by using a convolution engine, wherein the image data comprises a feature map and a depth information associated to an image;
      determining a kernel size based on the image data, clock speed associated to the convolution engine and number of available on-chip resources;
      allocating a plurality of instances to operate depth wise in parallel mode, wherein the plurality of instances is based on the kernel size, and wherein each instance, of the plurality of instances, performs parallel row wise convolution operation on the feature map and subsequently depth wise convolution operation on different feature maps resulting in layer combining, and wherein each instance further comprises a set of computing blocks operating concurrently to perform convolution operation on the feature map of the image in order to generate a convolution output;
      clustering one or more computing blocks with other computing blocks present in the set of computing blocks, when convolution operation performed, for an intermediate layer of the image, by the one or more computing blocks is complete, and wherein the other computing blocks are performing convolution operation on subsequent images; and
      aggregating convolution output of each computing block for each instance of the plurality of instances to produce a convolution result for the image, wherein the convolution output is aggregated using a pipeline adder.

6. The reconfigurable convolution engine of claim 5, wherein the image data comprises pixel resolution, number of filters to be applied, and a convolution layer.

7. The reconfigurable convolution engine of claim 5, wherein result of each computing block operating in pipeline is aggregated using the pipeline adder to generate the convolution result.

8. The reconfigurable convolution engine of claim 5, wherein one or more instances of the plurality of instances are grouped in a cluster to perform convolution operation on the feature map.

9. A non-transitory computer readable medium embodying a program executable in a computing device for performing a convolution operation on an image using a reconfigurable convolution engine, the program comprising:
   a program code for receiving image data for performing a convolution operation on an image by using a convolution engine, wherein the image data comprises a feature map and a depth information associated to an image;
   a program code for determining a kernel size based on the image data, clock speed associated to the convolution engine and number of available on-chip resources;
   a program code for allocating a plurality of instances to operate in depth wise in parallel mode, wherein the plurality of instances is based on the kernel size, and wherein each instance, of the plurality of instances, performs parallel row wise convolution operation on the feature map and subsequently depth wise convolution operation on different feature maps resulting in layer combining, and wherein each instance further comprises a set of computing blocks operating concurrently to perform convolution operation on the feature map of the image in order to generate a convolution output;
   a program code for clustering one or more computing blocks with other computing blocks present in the set of computing blocks, when convolution operation performed, for an intermediate layer of the image, by the one or more computing blocks is complete, and wherein the other computing blocks are performing convolution operation on subsequent images; and
   a program code for aggregating convolution output of each computing block for each instance of the plurality of instances to produce a convolution result for the image, wherein the convolution output is aggregated using a pipeline adder.

* * * * *